United States Patent [19]

Toll

[11] Patent Number: 4,498,649
[45] Date of Patent: Feb. 12, 1985

[54] AIRCRAFT SEATING

[75] Inventor: Ian C. Toll, Hamworthy, England

[73] Assignee: Futaire Limited, Poole, England

[21] Appl. No.: 449,001

[22] PCT Filed: Mar. 30, 1982

[86] PCT No.: PCT/GB82/00096
  § 371 Date: Nov. 23, 1982
  § 102(e) Date: Nov. 23, 1982

[87] PCT Pub. No.: WO82/03366
  PCT Pub. Date: Oct. 14, 1982

[30] Foreign Application Priority Data

Mar. 30, 1981 [GB] United Kingdom ............... 8109903

[51] Int. Cl.³ .......................................... B64D 11/06
[52] U.S. Cl. .................... 244/118.6; 297/445; 297/DIG. 2
[58] Field of Search .............. 244/118.6, 122 R, 123; 297/232, 445, 450, DIG. 1, DIG. 2; 248/188; 296/63–69

[56] References Cited

U.S. PATENT DOCUMENTS 2,933,127 4/1960 Brewster .................... 244/122 R
3,134,627 5/1964 Mason ............................. 297/445
3,873,654 3/1975 Smith ............................ 244/123
4,368,917 1/1983 Urai ........................... 297/DIG. 2
4,375,300 3/1983 Long et al. ................. 244/122 R

FOREIGN PATENT DOCUMENTS

1900079 1/1969 Fed. Rep. of Germany ... 244/118.6
2360441 3/1978 France ............................. 297/232
2022403 12/1979 United Kingdom ............... 297/232

Primary Examiner—Trygve M. Blix
Assistant Examiner—Rodney Corl
Attorney, Agent, or Firm—Shoemaker and Mattare, Ltd.

[57] ABSTRACT

A seat frame assembly for an aircraft or like seat comprises a leg 2 terminating at its lower end in a mechanical anchor for location in a floor fixing track. At least one laterally extending spar or beam 1 is fastened to the leg 2 and at least two seat support members 4 are fastened to the spar. The seat support members, leg and spar or beam have load bearing shells of fiber reinforced plastics defined by inner layers of carbon fiber disposed in an anisotropic or a quasi anisotropic structure and an outer layer or aramid fibers. Either a single beam of non-circular cross-section or at least two contiguous parallel laterally extending spars may be attached to the seat support members and the leg so that loads on the seat frame members are transmitted through the spars to the leg and the assembly acts as an integral structure.

19 Claims, 20 Drawing Figures

AIRCRAFT SEATING

FIELD OF THE INVENTION

The present invention relates to aircraft seating.

BACKGROUND OF THE INVENTION

The application of carbon fibre aircraft seats to permit high strength lightweight structures brings obvious advantages. For lightness it is desirable to form such components as the legs and the seat supports as load-bearing shell structures with carbon fibre reinforced inner layers and an aromatic polyamide fibre reinforced outer layer to impart the necessary mechanical properties such as abrasion resistance and fracture toughness. But it has not hitherto been clear how such structures can be applied to a modern spar type aircraft seat as illustrated, for example, in UK Patent Application No. 2022403 (Aircraft Furnishing Limited) to produce a sufficiently strong structure to withstand normal working loads and the crash stress loads demanded by aircraft certification bodies.

SUMMARY OF THE INVENTION

The invention provides a seat frame assembly for an aircraft or like seat comprising a leg terminating at its lower end in a mechanical anchor for location in a floor fixing track, at least one laterally extending spar or beam fastened to the leg and at least two seat support members fastened to the spar, wherein the seat support members, leg and spar or beam have load bearing shells of fibre reinforced plastics defined by inner layers of carbon fibre disposed in an anisotropic or a quasi anisotropic structure and an outer layer of aramid fibres, and either a single beam of non-circular cross-section or at least two contiguous parallel laterally extending spars are attached to the seat support members and the leg so that loads on the seat frame members are transmitted through the spars to the leg and the assembly acts as an integral structure.

It is an advantage in relation to the use of the present reinforced plastics material for the spars or beam that localised highly-stressed regions may be made of increased thickness. Such reinforcement is difficult to achieve with a conventional extruded metal beam.

There has also been devised a novel seat back and seat pan structure for use in association with the aforesaid frame assembly. The seat back comprises a load-bearing frame of cellular plastics material, a shaped diaphragm of polyamide fabric/resin moulded to the frame, and carbon fibre/resin strips cross-bracing the diaphragm. The seat pan may also comprise a load bearing frame of plastics foam, a shaped diaphragm moulded to the frame and consisting of a sheet of plastics foam sandwiched between polyamide fabric/resin layers, and carbon fibre/resin cross-bracing strips moulded to the diaphragm. The seat back and seat pan may be secured together in fixed angular relationship and may be pivoted to the frame to permit the seat to be reclined. They may be finished with a thin layer of upholstery foam and with a flame-resistant fabric.

BRIEF DESCRIPTION OF DRAWINGS

The invention will be further described with reference to the accompanying drawings, in which.

DETAILED DESCRIPTION OF PREFERRED EMBODIMENTS

Figures 1, 3:
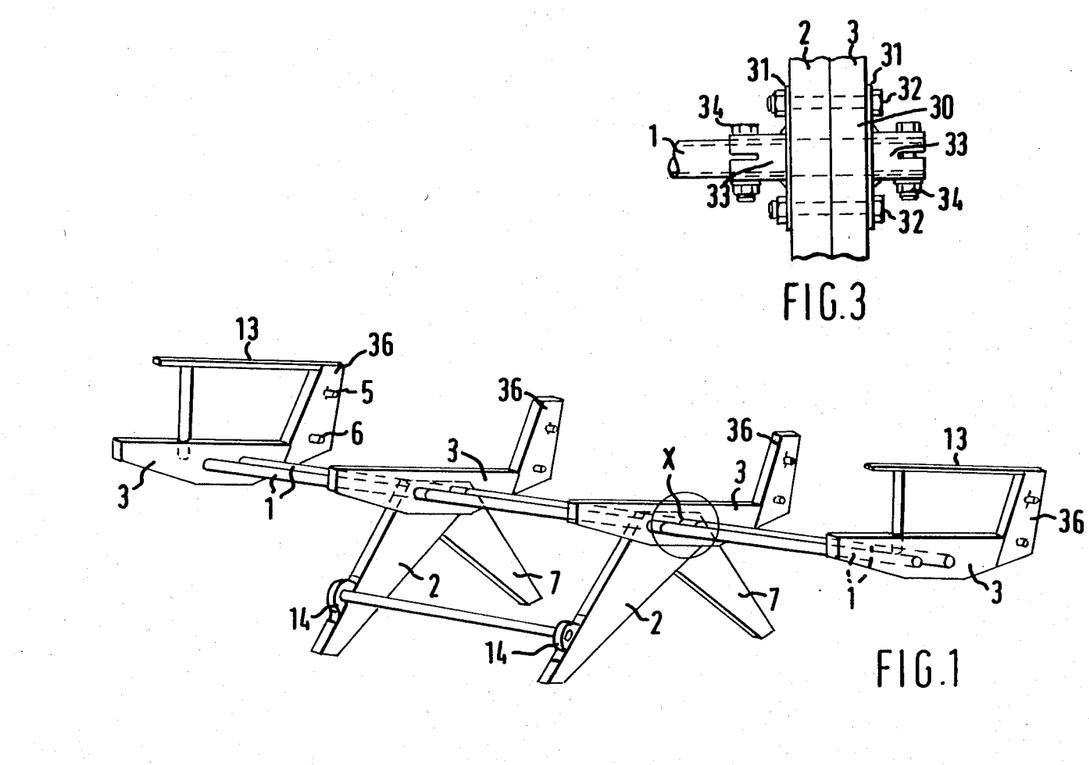
FIG. 1 is a forward perspective view of a leg and seat support frame assembly according to one form of the invention.
FIG. 3 is a diagrammatic front elevation on an enlarged scale of the portion of FIG. 1 within the circle X showing the fixing of a leg and a central seat support to a laterally extending spar.

As illustrated in FIG. 1 a seat frame comprises two laterally extending spars 1 in the form of tubes of circular section which are supported on a pair of leg assemblies 2, 7 themselves adapted to be secured to an aircraft floor which would normally be provided with rails for this purpose. The spars 1 support four longitudinally extending seat supports 3 to which seat pads may be fitted. The arrangement illustrated is for a three-seat unit and it will be appreciated that by using longer or shorter spars 1 and adding or removing seat supports 3 the number of seats may be varied as required.

Figures 2, 4, 5, 6, 7, 8:
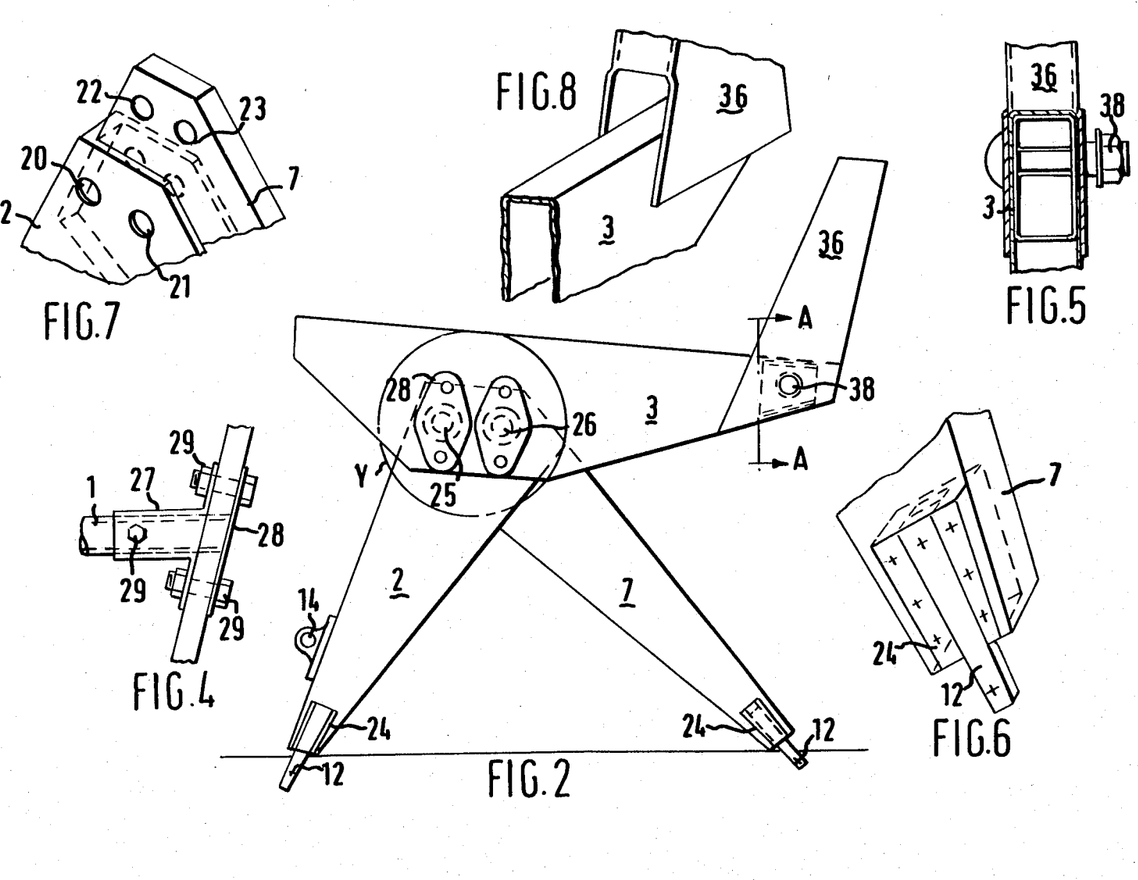
FIG. 2 is a side elevation of the assembly of FIG. 1 showing a leg, a seat support and a back attachment post.
FIG. 4 is a diagrammatic front elevation on an enlarged scale of the portion of FIG. 2 within the circle Y showing the fixing of an end seat support to a laterally extending spar.
FIG. 5 is a section on the line A—A of FIG. 2 showing the fixing of a back attachment post to a seat support.
FIG. 6 shows in section the base of one of the legs.
FIG. 7 is a view of the top of the legs during assembly showing how front and rear portions thereof are fitted together.
FIG. 8 is a perspective view of part of the seat support showing how the back attachment post is fitted thereto.
Figure 9:
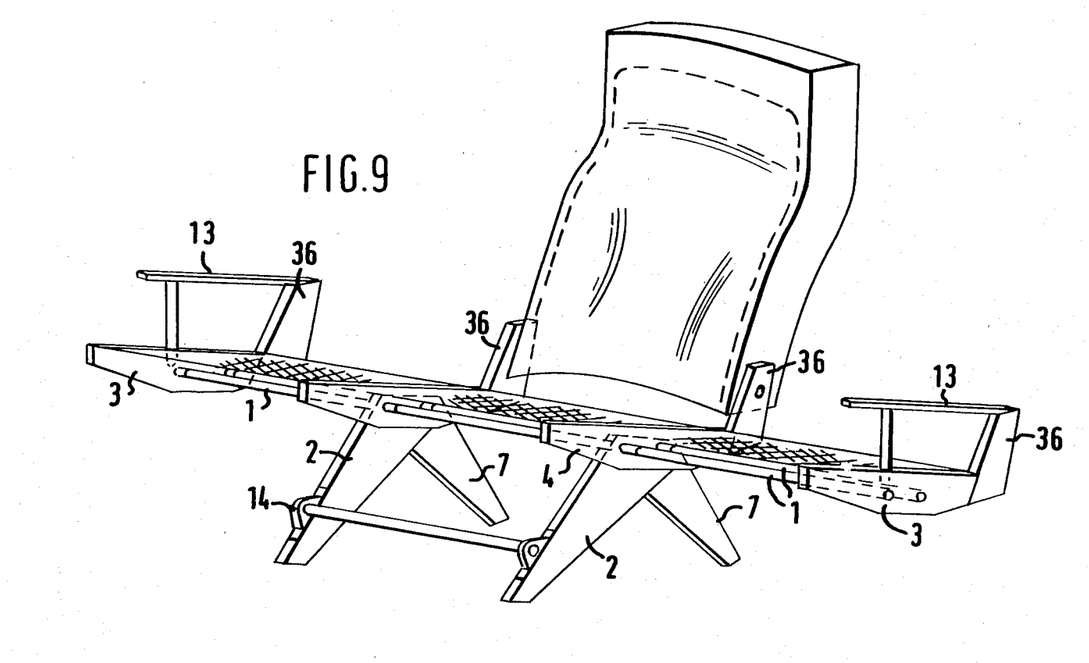
FIG. 9 is a forward perspective view of the leg and seat support frame with a seat back in position.
Figure 10A:
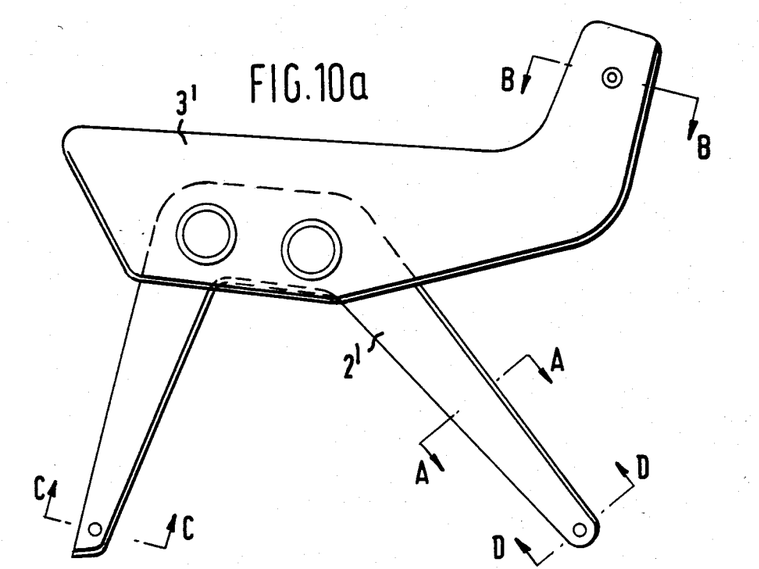
FIG. 10a shows in side elevation a leg, seat support and spars according to a second embodiment of the invention.
Figure 10B:
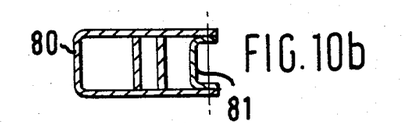
FIGS. 10b or 10c and 10d or 10e and 10f or 10g are alternative versions of the possible section on the lines A'—A', B'—B' and C'—C' or D'—D' of FIG. 10a respectively.
Figure 10C:
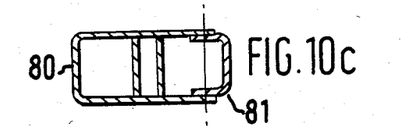
Figure 10D:
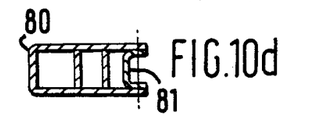
Figure 10E:
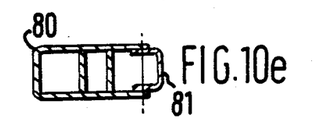
Figure 10F:
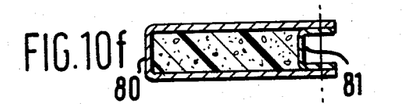
Figure 10G:
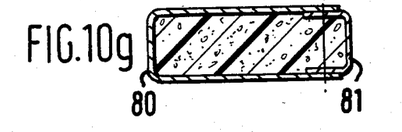

Turning now to FIGS. 2, 6 and 7 it is seen that each leg assembly 2, 7 consists of a forwardly and downwardly extending leg 2 which has at its upper end a pair of horizontally spaced holes 20, 21 and a rearwardly and downwardly extending leg 7 which has at its upper end a pair of spaced holes 22, 23 and which fits within the upper end of leg 2 as shown in FIG. 7. The holes 22, 23 register with the holes 20, 21 after which the spars 1 may be passed through to form an interlocked structure in which the angle between legs 2 and 7 is fixed and torsional load on the spars 1 is transferred effectively to them. It will be noted that the pair of spars 1 is closely spaced apart at not more than four spar diameters and they are smaller than the spars of a conventional monospar base frame. They are disposed generally in alignment with the direction of seat supports 3. Furthermore they pass through the stressed skin or shell of the leg which gives an interlocked structure which can fail only by tearing through the leg. The lower ends of legs 2, 7 are provided with locating blocks 24 for locking pins 12 which are received in the floor track.

The leg may be made using an appropriately shaped core of "Rohacell" high density polyurethane foam around which is wound four successive layers of resin-impregnated carbon fibre cloth with each cloth layer having different fibre directions from the preceding layer so as to produce a quasi-anisotropic shell structure. Onto the built-up carbon fibre layers is formed an outer layer of "Kelvar" fabric (Kelvar is a high performance aramid fibre whose mechanical strength is not as great as carbon fibre but which has higher impact and surface abrasion resistance). The resulting aramid skinned carbon fibre shell when cured by heat and pressure has very good mechanical properties and in particular toughness, and when formed into a leg of generally flat rectangular profile as shown, load in one major face is transmitted through the end walls to the other major face so that the load is absorbed through the shell as a whole. A risk with such a shell structure is that it may fail by buckling under an applied torsional load and the core of high density foam stiffens the surface of the shell structure and helps to prevent this happening. It is envisaged that the shell will have 0.75" (1.90 cms) of carbon fibre fabric and 0.015" (0.038 cms) of Kelvar.

It is apparent from FIG. 7 that the leg 7 fits within the walls of the leg 2 and that no foam reinforcement is present at the top of leg 2 so that the two parts may be slid together. In the resulting combined leg structure the legs 2 and 7 are adhered as well as mechanically locked and the angle between them has been selected in advance to give the appropriate foot pitch which can be altered as required during manufacture by appropriately cutting away the core and positioning the holes 20–23.

The integrally formed structure described above is not the only possible one for the two halves of the leg. Thus the foam core may be inserted into the shell after the shell has been moulded on a separate former, or it may sometimes be omitted entirely (though this is not preferred). As an alternative the shells of legs 2 and 7 may be formed as male and female halves with the end flanges of doubled material thickness and the halves can then be fitted together one inside the other about a central foam core and their adjoining flanges united by adhesive. It is believed that this will form a sufficiently unified shell structure and enables the two halves to be produced by moulding which has obvious production advantages.

A restraint bar 14 is secured to the front edges of the front legs 2 at an appropriate height to restrain forward movement of hand baggage stowed beneath the seat.

The seat supports 3 are of similar structure to the legs in that they are foam-filled carbon fibre/Kelvar shell structures. The spars 1 are received in a pair of apertures 25, 26 in a seat support 3 which is then locked in the appropriate translational and rotary relationship to the spars 1. As is apparent from FIG. 3 an aluminium or light alloy bush 30 passes through both leg 2 and seat support 3 which in this case abut one another and has flanges 31 through which fixing bolts 32 pass. The bush is continued outside flanges 31 to define collars 33 which may be tightened by clamping bolts 34 onto the respective spar 1. Instead of aluminium, the bush could be an injection moulding in a reinforced plastics material and such plastics injection mouldings are particularly suitable when it is desired to accomodate a beam of non-circular shape (see below). The outer seat supports 3 are, as shown in FIG. 4, angled to the vertical and are clamped to the spar 1 using a flanged bush 27, a plate 28 and fixing bolts 29. The spars 1 are also of a fibre reinforced resin composite material with an inner carbon fibre layer 0.060 ins. (0.152 cms) thick and an outer Kelvar layer 0.010 ins. (0.025 cms) thick. As is apparent from FIGS. 5 and 8 a seat back attachment post 36 which is also a carbon fibre/Kelvar shell structure mechanically interlocks with the back end of a seat support 3 to which it is secured by a fixing bolt 38. It will be apparent that the legs 2, 7, the spars 1 and the seat supports 3 form an interlocked mechanical structure in which linear and torsional loads on the seat supports 3 are transmitted through spars 1 to the legs 2, 7 where they are taken up by the aircraft structure.

It is of course possible to mould the seat support 3 and the back attachment post integrally as male and female halves which are bonded together and fit one inside the other about a central core similarly to the alternative form of the leg moulding.

In FIGS. 10a to 10e the seat support 3' and the leg assembly 2' are made from a core and two preformed mouldings 80, 81 of channel section which may be fitted together in two different orientations as shown.

Figure 11:
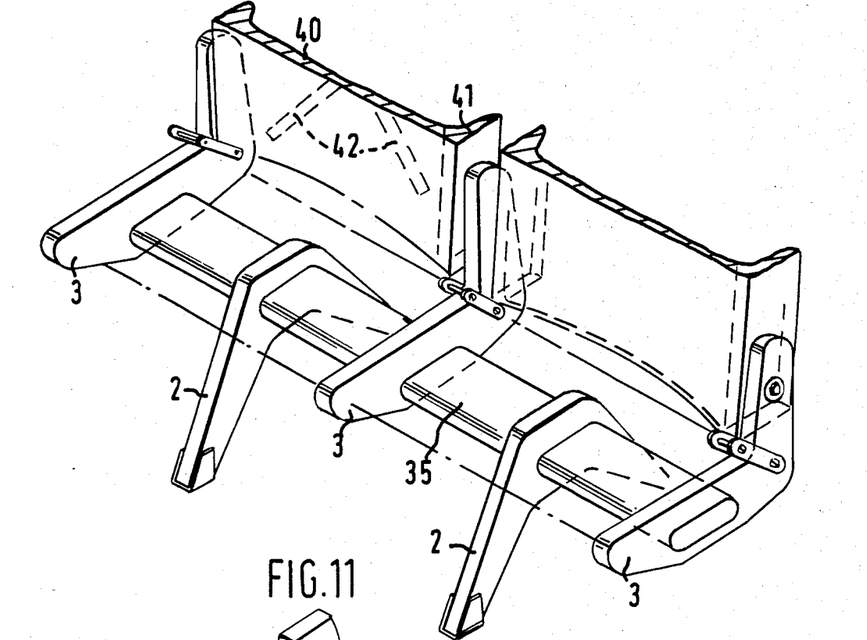
FIG. 11 is a perspective view of a leg and seat support frame according to a third embodiment of the invention.

In FIG. 11 the seat supports 3 and legs 2 are interconnected by a single generally horizontally directed oval beam 35 that mechanically interlocks therewith and is also bonded thereto as shown to form an integral structure.

Figure 12:
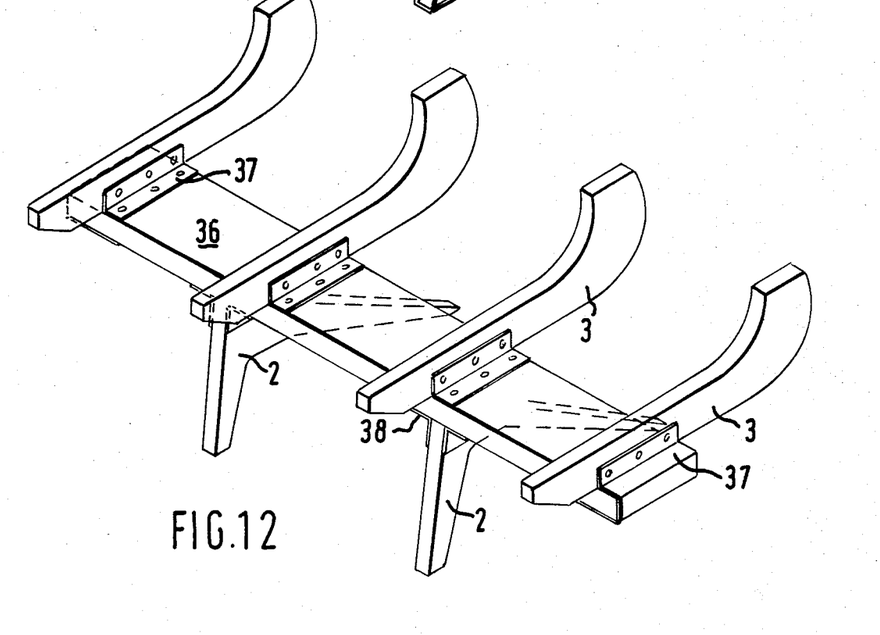
FIG. 12 is a perspective view of a leg and seat support frame according to a fourth embodiment of the invention.

In FIG. 12 a rectangular beam 36 is fastened to the top surface of legs 2 by fixing brackets 37 and ferrite connectors 38. Seat supports 3 rest on the top face of beam 36 to which they are fastened by additional brackets 37 and connectors 38. The seat supports 3, brackets 37, legs 2 and beam 36 are also adhered together so as to form an integral structure.

Figures 13, 14:
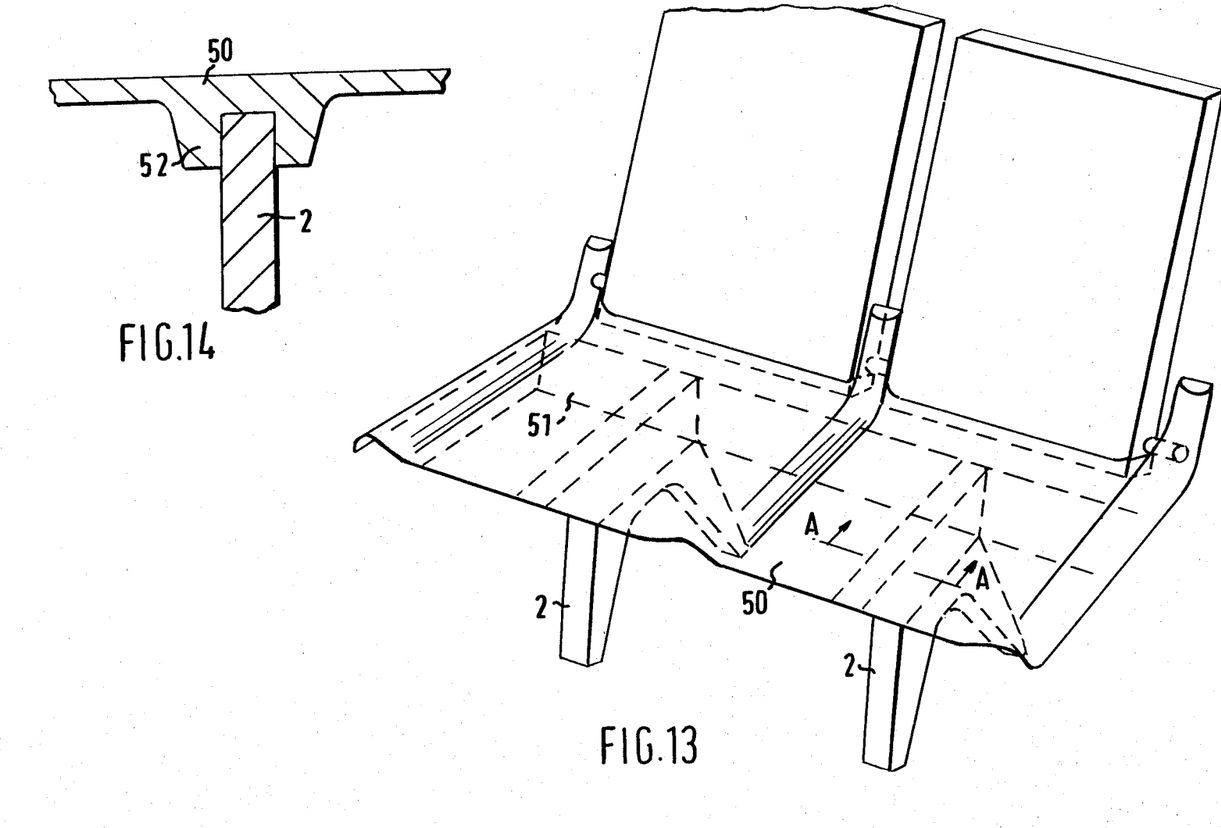
FIG. 13 is a perspective view of a pair of seats according to a fifth embodiment of the invention.
FIG. 14 is a framgmentary vertical section on the line A—A of FIG. 13.

FIGS. 13 and 14 show a seat for a helicopter comprising a pair of laterally spaced legs 2, an integral diaphragm and seat support 50 and an in-built non-circular beam 51. The legs 2 fit onto thickened regions 52 of the diaphragm 50 as shown.

The seat frame may be used in association with a back rest of orthopaedic design moulded by silicone press moulding which creates lumbar support and helps prevent lateral side roll for the occupant as well as providing some rigid protection against being accidentally kneed in the small of the back. The back consists of a vacuum moulded Kelvar diaphragm 40 (FIG. 11) 0.015" (0.038 cms) to 0.040" (0.102 cms) thick shaped to conform to the shape of the back and stiffened by a surround 41 of high density polyurethane foam. The diaphragm is cross-braced by diagonal strips 42 of carbon fibre 25 mm wide and 1.5 mm thick. The sides of the seat are formed with integrally moulded metal bushes for fixing bolts. The front face of the seat may be covered with a relatively thin layer of upholstery foam. This construction is considerably lighter than in a conventional seat back where higher density foam is required both to provide a comfortable seating surface and to support the occupant.

The seat pan may also be a silicone press moulding and may include a diaphragm which is a structure of upper and lower Kelvar layers and a thin high density Rohacell polyurethane sheet sandwiched between them. The seat pan may have an integrally moulded surround of high density polyurethane foam cross-braced with strips of carbon fibre and upstanding ears by which it may be bolted to the seat back. Again a thin layer of upholstery foam is adhered to the top of the seat pan.

The seat back and seat pan mouldings may also incorporate a decorative finish on their exterior which is protected by a skin of resin. Thus the seat back and pan would be self-finished and conventional lightweight plastics trim panels could be dispensed with, again saving weight.

The seat pan and back assembly may be pivoted between the front of a pair of the seat supports and resiliently suspended at its rear end. Alternatively the seat pan and back may be pivoted to the fixing posts and suspended to the front ends of the seat supports either rigidly or by a device which allows the seat to recline in steps or by a resilient support, e.g. rubber buffers, or by a combination of any of these means. It is an advantage of the present arrangement that the seat and pan retain the same angle as the seat is reclined so that the passenger does not tend to slip off his seat in the reclined position thereof.

It will be apparent that various modifications may be made to the invention without departing from the invention, the scope of which is defined in the appended claims.

I claim:

1. A seat frame assembly for an aircraft or like seat comprising a leg terminating at its lower end in a mechanical anchor for location in a floor fixing track, at least one laterally extending spar means fastened to the leg and at least two seat support members fastened to the spar, the seat support members, leg and spar having load bearing shells of fibre reinforced plastic defined by inner layers of carbon fibre disposed in an anisotropic like structure and an outer layer of aramid fibres so that loads on the seat frame members are transmitted through the spar means to the leg and the assembly acts as an integral structure.

2. A seat frame assembly according to claim 1, wherein said spar means includes a pair of contiguous parallel laterally extending spars passing through apertures through the leg and through the seat support members.

3. A seat frame assembly according to claim 1, wherein said spar means includes a single beam of non-circular cross-section passing through apertures through the leg and through the seat support members and which mechanically interlocks therewith.

4. A seat frame assembly according to claim 1, wherein the seat support members rest on a single beam of non-circular cross-section that rests on the top of the leg.

5. A seat frame assembly according to claim 1, in which front and rear legs are combined so as to lie in a single longitudinal plane as a generally inverted V-shaped structure, the spar means being attached adjacent the apex of said structure.

6. A seat frame according to claim 5, having two laterally spaced combined front and rear leg structures.

7. A seat frame according to claims 1, 2, 3, 4, 5 or 6 in which at least one of the leg and seat support members has a core of high density plastic foam to impart surface stiffness thereto.

8. A seat frame according to claims 1, 2, 3, 4, 5 or 6 in which the wall of at least one of the leg and seat support is from 0.045 ins. (0.114 cms) to 0.080 ins. (0.203 cms) thick.

9. A seat frame according to claim 8 in which the spar means are about 0.070 inches (0.178 cms) in thickness.

10. An aircraft seat including a seat frame assembly as claimed in claims 1, 2, 3, 4, 5 or 6 to which is secured a seat back which is a shaped moulding with a thin layer of polyamide fabric resin defining a diaphragm, a frame reinforced with a load bearing plastic foam moulded into the diaphragm and cross-bracing secured to the diaphragm of carbon fibre/resin strips.

11. A seat frame assembly according to claim 1 wherein a beam of non-circular cross-section, seat diaphragm and seat support members are formed as an integral structure that rests on the top of the leg.

12. A seat frame assembly for an aircraft seat comprising at least one generally inverted V-shaped member defining front and rear legs of the seat each terminating at its lower end in a mechanical anchor for location in a floor fixing track, at least two seat support members and spar means attaching the seat support members to the apex of the V-shaped member, wherein:
   (a) said seat support members and V-shaped member are formed as closed shells from 0.045 to 0.080 inches in thickness formed of fibre reinforced plastic having an inner layer of carbon fibres arranged in a generally anisotropic structure and an outer layer of aramid fibres;
   (b) the shell of said V-shaped member defines a pair of side walls and end walls, means in said side walls defining opposed apertures through which said spar means passes; and
   (c) said spar means being about 0.7 inches in thickness, being formed of fibre reinforced plastic having an inner layer of carbon fibres and an outer layer of aramid fibres, and being attached to said V-shaped member and to said seat support members so that loads on the seat frame members are transmitted through the spars to the V-shaped member and the assembly acts as an integral structure.

13. A seat frame assembly according to claim 12, wherein a pair of contiguous parallel laterally extending spars passes through apertures through the seat support members.

14. A seat frame assembly according to claim 12, wherein a single beam of non-circular cross-section passes through apertures through the leg and through the seat support members and mechanically interlocks therewith.

15. A seat frame assembly according to claim 12, wherein the seat support members rest on a single beam of non-circular cross-section that rests on the top of the leg.

16. A seat frame according to claim 15, having two laterally spaced leg structures.

17. A seat frame according to claims 12, 13, 14 or 15 in which at least one of the leg and seat support has a core of high density plastic foam to impart surface stiffness thereto.

18. An aircraft seat including a seat frame assembly as claimed in claim 12 to which is secured a seat back which is a shaped moulding with a thin layer of polyamide fabric resin defining a diaphragm, a frame reinforced with a load bearing plastic foam moulded into the diaphragm and cross-bracing secured to the diaphragm of carbon fibre/resin strips.

19. A seat frame assembly according to claim 12 wherein a spar of non-circular cross-section, seat diaphragm and seat support members are formed as an integral structure that rests on the top of the leg.

* * * * *